United States Patent [19]

Metzger

[11] 3,887,671

[45] June 3, 1975

[54] PROCESS FOR PRODUCING GRANULAR, EXPANDED CERAMIC MATERIALS

[76] Inventor: Emil Metzger, 8240 Thayngen, Zieglerweg 54, Switzerland

[22] Filed: Mar. 1, 1972

[21] Appl. No.: 230,660

[30] Foreign Application Priority Data
Mar. 5, 1971 Germany............................ 2110498

[52] U.S. Cl............. 264/43; 106/40 R; 106/288 B; 264/56; 264/117
[51] Int. Cl......................... B28b 5/00; B29d 27/04
[58] Field of Search ......... 106/40, 68, 69, 89, 40 R, 106/288 B; 264/43, 117

[56] References Cited
UNITED STATES PATENTS

| | | | |
|---|---|---|---|
| 2,015,381 | 9/1935 | Harding............................ | 264/43 X |
| 2,569,323 | 9/1951 | Maynard............................ | 264/43 X |
| 2,786,772 | 3/1957 | Stewart et al.................. | 264/43 UX |
| 2,990,289 | 6/1961 | Lambie................................ | 106/68 |
| 3,436,238 | 4/1969 | Criss.............................. | 264/43 UX |
| 3,444,277 | 5/1969 | McMillan............................. | 264/43 |
| 3,544,666 | 12/1970 | Shiota et al...................... | 264/43 X |
| 3,673,290 | 6/1972 | Brubaker et al..................... | 264/43 |

FOREIGN PATENTS OR APPLICATIONS

| | | | |
|---|---|---|---|
| 1,211,522 | 2/1966 | Germany.............................. | 264/43 |

*Primary Examiner*—Philip E. Anderson
*Attorney, Agent, or Firm*—Lowe, King & Price

[57] ABSTRACT

A process for manufacturing granular expanded ceramic materials comprising forming a prime material consisting of at least 25% of gas forming mineral substances, and the balance of mineral substances with a $SiO_2$ content exceeding 65% after grinding, mixing and homogenising into pellets by the addition of water, completely surrounding said pellets whilst in the moist condition by a layer of cement applied in a rolling or tumbling operation, drying and preheating said pellets in a drying kiln for a period of about 20 minutes at temperatures up to approximately 700°C maximum, heating said pellets with a very quick rise in temperature in a firing kiln for a period of not less than 3–5 minutes up to 1000° to 1200°C, and finally slowly cooling down said pellets to below 550°C to form grains.

12 Claims, 1 Drawing Figure

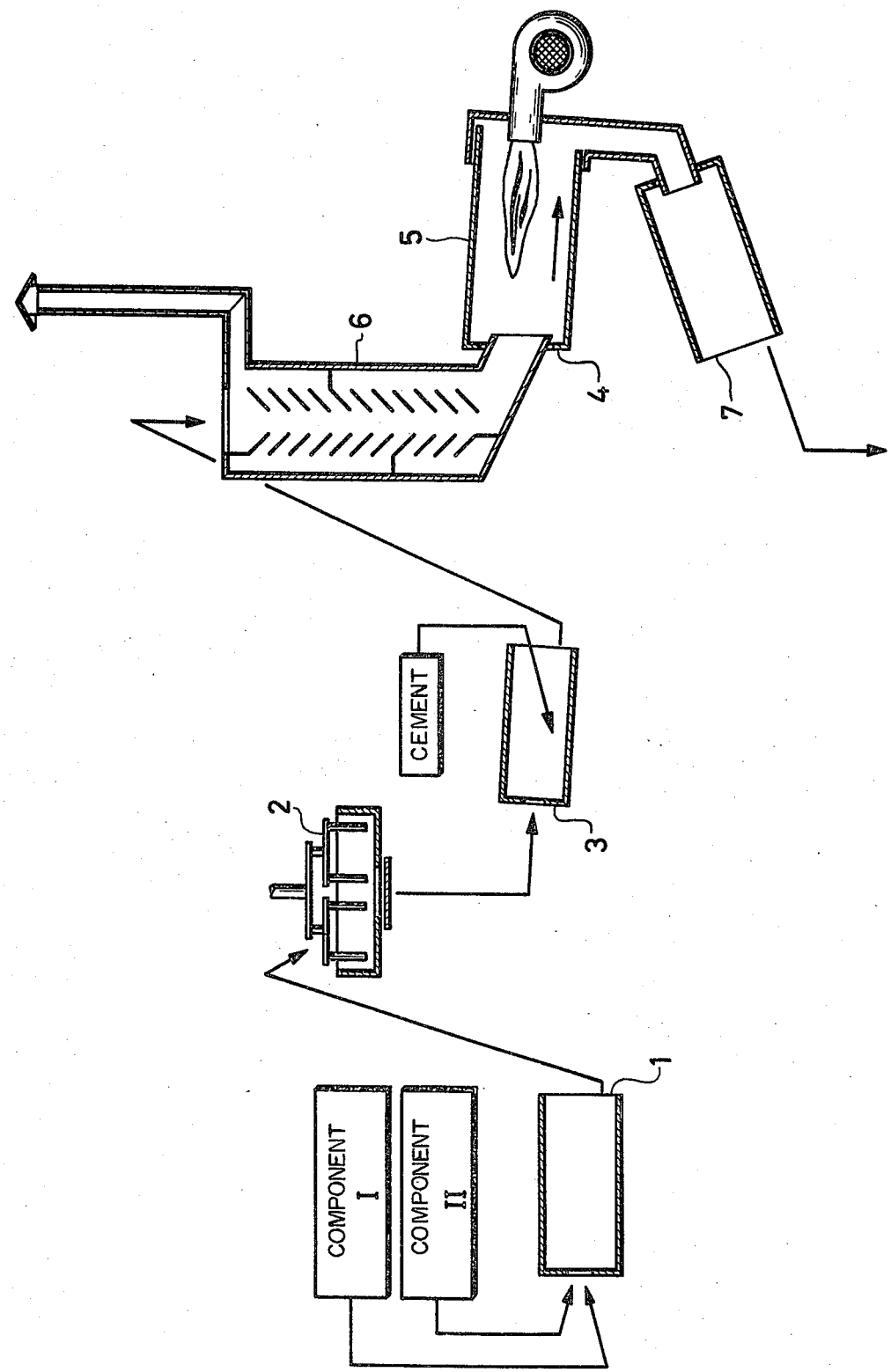

PROCESS FOR PRODUCING GRANULAR, EXPANDED CERAMIC MATERIALS

The invention relates to a process for manufacturing granular expanded ceramic materials. Materials of this kind with grain sizes of the order of about 5 to 20 mm diameter can be used to advantage as aggregates for lightweight concrete because of their low weight and their heat insulating properties.

It is known that pellets can be pre-formed from clays which are relatively quick-sintering and which tend to form gas under the effect of heat, e.g. bituminous clays or oil shales or those containing iron oxide and silicon dioxide, and these pellets are fired in a kiln, with the addition of a separating agent. The formations of gas which occur there, which lead to foaming of the clay mass as it softens under the influence of heat, distend the pellets into porous bodies of a more or less spherical shape. This formation of gas can be caused in different ways, such as the slow-burning of a bitumen content under the exclusion of air, a reaction of iron oxide with silicon dioxide or a conversion of iron oxides, oxygen being released in both cases. It is also known that catalytic interactions can occur between the flue gases of the kiln and the iron compounds in the clay mass, the result of which is that carbon is deposited in the clay, and at higher temperatures this carbon burns off (E. Krause: Technologie der Keramik 1967, Volume 4, page 3).

A deciding factor for the foaming is that the rate at which the material becomes plastic keeps in step with the evolution of the gas, so that a uniform bubble structure is obtained, and any escape into the atmosphere of the gases producing distension is prevented by the fusing together of the outside layer. This requires that in the final condition the clay should be a homogeneous viscous molten mass in which the shape of the distended pellets, until they solidify, is maintained only by the pressure of the gases being evolved during the firing.

The resulting material, of a good quality, is uniformly permeated with bubbles, but the dividing walls and bridges between the bubbles have also, in their turn, a bubble structure with essentially smaller bubble diameters i.e. secondary bubble formations. These dividing walls, which represent the inner framework of the fired grains, are quite considerably weakened by the extensive secondary bubble formations which occur in them, particularly by those bubbles which traverse their surface. Because of this the compression strength of the grains obtained is relatively low. By the combining of a number of such bubbles, fissured and branching spaces, which are very different from the spherical shape of a bubble, arise in the dividing walls and bridges and can break through the dividing walls, so that cavity systems which pass through the grains and form a passage occur, and these cavity systems communicate with the atmosphere via imperfections in the outer skin, which, for example, can arise through the grains rolling over each other and generally coming into contact with one another in their manufacturing process or through bubbles breaking through the outer skin. The pervading porosity resulting from this allows the grains to take up water; a fact which has an adverse influence on their heat-insulating properties.

It is also known that the pellets can be coated with a separating agent, or that such an agent can be added during the firing process, e.g. cement or coarse sand, so as to prevent the individual pellets from being baked to each other, such additives having a higher melting point than that of the clay being foamed (DAS 1 211 522, OS 1 905 319).

Finally, it has been proposed that, for reasons of economy, minerals which distend particularly easily should be mixed with substances which are not self-distending, such as suitable clays or blast furnace slag (DAS 1 211 522). However, in this case too the molten mass is essentially homogeneous, with the unsatisfactory bubble structure described above. The advantages of cheapness are, however, counterbalanced by the costs of the preparation of the portion of the material which is capable of distending.

The object of the invention is to develop a process for manufacturing grains of foamed mineral substances which are easily obtainable in many places and which can be found in rich deposits which do not entail any special extraction costs, in which process the grains must have high compression strengths and must not have any internal cavity systems or pore-systems, particularly those which communicate with the atmosphere and could consequently take up water. In addition they should present a fine-grained, rough (that is to say a very expanded) surface towards binding media such as concrete or adhesives. In order to obtain the required strength whilst retaining a bubble structure necessary for heat insulation and economy in weight, and secondly in order to avoid penetrable cavity systems, the bridges and walls which form between the bubbles must not be substantially permeated with cavities and must have a texture which in itself is unbroken.

According to the present invention, a process for manufacturing granular expanded ceramic materials comprises forming a prime material consisting of at least 25% of gas forming mineral substances, and the balance of mineral substances with a $SiO_2$ content exceeding 65% after grinding, mixing and homogenising into pellets by the addition of water, completely surrounding the pellets, whilst in the moist conditions, by a layer of cement applied in a rolling or tumbling operation, drying and preheating the pellets in a drying kiln for a period of about 20 minutes at temperatures up to approximately 700°C maximum, heating the pellets with a very quick rise in temperature in a firing kiln for a period of not less than 3–5 minutes up to 1000° to 1200°C, and finally slowly cooling them down to below 550°C to form grains.

The invention also includes within its scope a granular, expanded ceramic material manufactured according to the above process.

The gas-forming prime material can be a distensible clay or argillite or a volcanic earth such as pumice. The silicate-containing material is preferably sea sand or sandstone.

The mixture proportions mentioned are on the assumption that the prime material for the pellets consists of a proportion of gas-forming substances such as clay, for example, and of a proportion containing silicate such as sandstone, for example. However, the mixing ratio mentioned can already be present in a single, naturally-occurring prime material such as, for example, a sandstone containing clay.

The cement layer surrounding the pre-formed pellets sets during the drying and heating-up step. The fissures and crazing of the then solid cement shell occurring as the pellets distend, fuse together at the temperatures already existing at this point of time, the material for this fusing operation being obtained from cement and from the bordering layer of the pellet material, of which the low-sintering constituents act as a flux. This effect can be reinforced by blowing in cement dust alongside the burner parallel to the flame, during the firing step.

It is also useful to maintain a reducing atmosphere during the drying and firing stages so as to make use of the distending effect which can be obtained by catalytic carbon enrichment.

Finally, in order to improve the distending action, caustic soda (NaOH) to an amount of 1–3%, depending on the distension resistance of the prime material, can be added to the water used for moistening the pellet material.

The grains obtained by the process of the invention show a uniform bubble structure with the dividing walls and bridges between the bubbles consisting essentially of a bubble-free molten material which has solidifed, in which crystallites with a high silicon content have been deposited and form the framework. On the outside the grains are surrounded by a solid, unbroken shell of cement, in which the cracks and crazing which occurred during the firing are sealed up by fusion.

The invention will now be described in greater detail, by way of example, with reference to the accompanying drawings, in which:

The FIGURE is a schematic representation of the process of the invention.

The prime materials for the process of the invention are a distensible clay in proportions of 25–50%, and a sand containing more than 55% of $SiO_2$ in proportions of 75–50%, the materials being ground in a ball mill 1 and mixed. The ground material thus obtained is moistened in a horizontal mixer 2 with quickly rotatable paddles, to produce preformed pellets. The resulting pellets are then coated, in a slightly inclined rotating tube 3, with blown-in cement dust which is rolled into the surface of the pellets by their rolling over each other down the tube 3. It is essential for the invention that in this operation an unbroken and sealed cement layer is formed on the pellets, this cement layer being sufficiently moistened by the water contained in the pellets for the cement to set. The grains thus obtained are approximately spherical and are coated with an unbroken layer of cement. Before a drying kiln 4, and above the entrance to its rotating drum 5 which as shown is permeated by a burner flame, there is provided a drying tower 6 through which flow the hot gases issuing from the drum 5, and in which the temperature rises up to around 700°C. The grains, coated with the cement layer, are fed in at the top of the drying tower 6 and take about half to 1 hour to pass through it. During this time the cement layer hardens completely. As an alternative to the drying tower, horizontal pre-heating equipment, e.g. a grid-type pre-heater, can be used.

When the product passes from the drying tower into the drum 5 of the kiln 4, it is quickly brought up to a temperature of 1000° to 1200°C, the resting time in the kiln itself being at least 3 to 5 minutes. During this phase the distension operation occurs. The distended product is cooled off to below 550°C in the cooling drum 7 connected to the kiln, and the distended material solidifies.

During this operation, the cement layer which gives the unbroken shell has the task of preventing, during the latter part of the drying step, the escape from the grains of the water of crystallisation which has so far been expelled, so that this water of crystallisation can co-operate in the distension operation. In the firing operation itself the cement shell can offer resistance to possible deformation of the softening grains as they roll over each other, and maintain the spherical shape of the grains. The cracking and crazing of the cement layer occurring during distension are progressively balanced by a fusing of the border zone between the material of the grains and the cement, so that the gas-seal of the outer layer formed by the cement is essentially maintained during the whole firing operation. This operation can be reinforced by blowing in cement dust during the firing. The earlier sintering parts of the material of the grains act at the same time as a flux, whilst the outer layer of the cement shell, or respectively the remaining pieces of it, remain hard because of the higher melting point of the cement. In addition, the cement layer which has not softened at the firing temperatures acts as a separating agent which prevents the grains from being baked to each other. The surface of the cememt layer has a good, fine-grained roughness, which gives a good key for cement or adhesives.

The grains obtained by this process have a very high strength, without this being offset by a lower degree of foaming—that is to say, dividing walls of greater thickness between the bubbles. In the case of the prior art grains, the bridges between the bubbles include a secondary bubble structure which greatly reduces the strength, as by bubbles coalescing together the above described fissured and penetrable cavities have been formed. Here the material is a homogeneous melt whose uniform viscosity throughout the material allowed this foaming-up of the supporting dividing walls and bridges during the firing operation. In the case of the grains of the invention, the bridges between the bubbles are not porous, but are permeated with crystallites from the constituents of the material which are high in silicon. These have diameters ranging from $\mu m$ up to about 0.03 mm. These crystallites participated in the melting process of the distensible material only to the extent that their outer surfaces fused, and a border layer formed round the larger crystallites, and this has led to an intimate combination between the two constituents. But this border layer too is permeated with crystallites of a very small size. The grain structure, in which the aforesaid crystallites form solid blocks, gives the high strength of the grains of the invention. The average thickness of the dividing walls between the individual bubbles was approximately the same in the case of both tests pieces. Furthermore, in the case of the process of the invention, the wall thickness of the bubble dividing walls can be adjusted by varying the proportion of the distensible constituents without the texture of these dividing walls themselves being changed because of this.

EXAMPLES (each with the same average grain size and bubble size)

Example 1

Manufactured conventionally

Prime material :   opalescent clay with conventional

Example 1-Continued

Manufactured conventionally preparation and distention without any addition of sand.

The compression strength of the grain obtained in concrete with 300 kg/m³ of Portland cement was 31 kg/cm².

Example 2

Manufactured according to the invention

Prime material: Constituent I:
Opalescent clay as in Example 1 for 50% of the total mass.
Constituent II:
Sea sand with 92% of $SiO_2$ for 50% of the total mass.

The materials were ground to 3,000 Blaine and homogenised. The treatment was carried out according to the process of the invention. The compression strength of the grain obtained in concrete with 300 kg/m³ of Portland cement, amounted to 476 kg/cm².

Example 3

Manufactured according to the invention

Prime material: Constituent I:
Opalescent clay for 25% of the total mass as example 1.
Constituent II:
Screened sandstone with 72% of $SiO_2$ for 75% of the total mass.

The materials were treated as in Example 2. The compression strength of the grain obtained, in concrete with 300 kg/m³ of Portland Cement, was 396 kg/cm².

In the case of all three examples, the bubble structure and bubble size obtained were the same, except that the secondary bubble structure and cavity formation respectively in the dividing walls were not present in the products as Examples 2 and 3, in contrast to Example 1.

The granules obtained in Examples 2 and 3 were approximately spherical and had an unbroken outer shell, essentially free from pores, and the surface of this outer shell had a fine-grained roughness which allows good keying with concrete or adhesives. The joints and crazing of the concrete shell were covered by melted-on cement. In contrast to this, the product in Example 1 had a relatively smooth, sintered outer surface whose adhesion to concrete or adhesives was reduced. Furthermore, this surface was pierced by bubbles, or in the case of larger cavities lying near the outer skin was indented, or could be indented, by mechanical action.

The granules obtained with the process of the invention are particularly suitable for ready-made parts in lightweight construction methods, parts which are intended to have a high strength with small cross sections and weights, and good heat-insulating properties.

What I claim is:

1. A process for manufacturing granular expanded ceramic materials comprising forming a prime material consisting of at least 25% of gas forming mineral substances, selected from the group consisting of distensible clay, argillite or a volcanic earth and the balance of mineral substances with a $SiO_2$ content exceeding 65% after grinding, selected from the group consisting of sea sand and sandstone, mixing and homogenizing the material into pellets by the addition of water containing NaOH; completely surrounding said pellets, while in the moist condition, by a layer of cement applied in a rolling or tumbling operation, drying and preheating said pellets in a drying kiln for a period of about 20 minutes at temperatures up to approximately 700°C. maximum, heating said pellets with a very quick rise in temperature in a firing kiln for a period of not less than 3–5 minutes up to 1,000° to 1,200°C., and finally slowly cooling down said pellets to below 550°C. to form grains.

2. A process as claimed in claim 1, wherein said gas-forming prime material is a distensible clay.

3. A process as claimed in claim 1, wherein said gas-forming prime material is argillite.

4. A process as claimed in claim 1, wherein said gas-forming prime material is a volcanic earth material.

5. A process as claimed in claim 4, wherein said volcanic earth material is pumice.

6. A process as claimed in claim 1, wherein said silicate containing material is sea sand.

7. A process as claimed in claim 1, wherein said silicate containing material is sandstone.

8. A process as claimed in claim 1, wherein a burner is provided in said firing kiln and cement dust is blown in alongside said burner, parallel to a flame thereof.

9. A process as claimed in claim 1, wherein a reducing atmosphere is maintained in said firing kiln.

10. A process as claimed in claim 1, wherein said prime material is a naturally-occurring material, 25% of which consists of gas-forming substances and the remainder consists of substances with a $SiO_2$ content exceeding 65%.

11. A process as claimed in claim 1, wherein caustic soda (NaOH) in amounts of 1–3% is added to said water used for forming said pellets.

12. A granular expanded ceramic material manufactured according to the process defined in claim 1, having a uniform bubble structure with dividing walls and bridges between said bubbles consisting of an essentially bubble-free molten material which has solidifed, in which crystallites with a high silicon content have been deposited and form a framework, and are surrounded by a rough, solid shell of cement.

* * * * *